United States Patent [19]

Sheridon

[11] 4,126,854
[45] Nov. 21, 1978

[54] TWISTING BALL PANEL DISPLAY
[75] Inventor: Nicholas K. Sheridon, Saratoga, Calif.
[73] Assignee: Xerox Corporation, Stamford, Conn.
[21] Appl. No.: 683,448
[22] Filed: May 5, 1976
[51] Int. Cl.² ............................................. G09F 9/32
[52] U.S. Cl. ............................. 340/373; 340/324 M; 350/362
[58] Field of Search .......... 340/324 M, 366 R, 366 B, 340/378 R, 373; 350/160 R, 161 R, 161 S, 355, 362; 40/52 R

[56] References Cited

U.S. PATENT DOCUMENTS

| | | | |
|---|---|---|---|
| 1,963,496 | 6/1934 | Land | 350/160 R |
| 3,210,757 | 10/1965 | Jacob | 340/373 |
| 3,341,274 | 9/1967 | Marks | 350/160 R |
| 3,451,742 | 6/1969 | Marks | 350/160 R |
| 3,469,258 | 9/1969 | Winrow | 340/373 |
| 3,594,065 | 7/1971 | Marks | 350/160 R |
| 3,767,392 | 10/1973 | Ota | 350/362 X |

*Primary Examiner*—David L. Trafton

[57] ABSTRACT

A display system in which the display panel is comprised of a plurality of particles which have an electrical anisotropy due to hemispherical surface coatings of different Zeta potential and their distribution in a volume of a dielectric liquid, and which also have an optical anisotropy due to the hemispherical surface coatings having different optical characteristics which may be due to the color or other optical properties of the hemispherical coatings. Under the action of an external electric field, the particles will rotate in accordance with their electrical anisotropy to provide a display in accordance with their optical anisotropy. The display has switching threshold and memory capabilities.

17 Claims, 10 Drawing Figures

TWISTING BALL PANEL DISPLAY

BACKGROUND OF THE INVENTION

Flat display panel devices continues to receive much attention since they provide distinct advantages over conventional cathode ray tubes which are now the standard visual display device. U.S. Pat. No. 3,612,758, sets forth those advantages and discloses a flat display panel employing migration of color pigment particles of form an image on a matrix addressable panel. Specifically, the patented display utilizes a suspension of colored particles maintained in a thin layer of dyed dielectric liquid, enclosed between two electrodes, one of which is transparent. Upon the application of a D.C. voltage of suitable polarity between the electrodes, colored particles will move through the liquid toward the transparent electrode and deposit on it. The liquid is dyed a contrasting color to the colored particles such that only when the particles are deposited on, or in very close proximity to, the transparent electrode will the particles be visible. Otherwise, the color of the display as viewed through the transparent electrode will be that of the dyed dielectric liquid.

The flat panel display of U.S. Pat. No. 3,612,758 has several problems associated therewith which are difficult to solve. One problem relates to the usage of a dyed liquid; the dye tends to be absorbed on the colored particles and the transparent electrode, diminishing the contrast and appearance of the display. Particle settling over a period of time (due to gravity), particle agglomeration and clumping together over a period of time, and particle adherence to the transparent electrode pose additional problems. Another problem is that the particles must move substantial distances during display operation, thereby causing the display to operate with relative slowness. Also, because D.C. fields are used, it is probable that electro-chemical changes will take place in the display over extended periods of time.

Recent literature has proposed magnetic particle displays in lieu of cathode ray tube displays in order to overcome the size limitations, high voltage and high power requirements of cathode ray tube displays. The model magnetic particle display proposed uses tiny particles each of which is a plastic magnet comprised of ferrite powder held together by a suitable binder. The particles are about 0.8 millimeters in diameter, black in one hemisphere and silvered (or otherwise light reflective) in the other hemisphere. A magnetic field generated by the four conductors nearest a desired image spot controls the orientation of the particles proximate that spot such that their orientation with respect to a viewer conveys optical images by scattering of ambient light. Because of the close proximity of the conductors to other image spots, there arises a problem of discrimination, that is, the ability to address a chosen image spot without addressing other proximate image spots. In order to prevent clustering of the magnetic particles, the particles are individually encapsulated with small amounts of clear liquid in small, thin walled transparent spherical shells. The encapsulated particles are then cemented onto a suitable substrate to form the display panel. The requirements of a magnetic field to provide particle orientation, individual encapsulation of the particles, individual attachment of the particles to a suitable substrate, and discrimination problems present serious drawbacks to utilization of magnetic particle displays of the type described. Also, magnetic particle displays of the type described have neither an effective built-in threshold behavior nor an effective memory capability.

OBJECTS OF THE INVENTION

It is an object of the present invention to provide an improved imaging/display system.

It is a further object of the present invention to provide an imaging/display system that is relatively inexpensive to produce.

It is a further object of the present invention to provide an imaging/display system that has a threshold behavior.

It is a still further object of the present invention to provide an imaging/display system which has memory capabilities.

It is a further object of the present invention to provide an imaging/display system that is easy to manufacture.

SUMMARY OF THE INVENTION

In accordance with the invention, a flat panel display is provided by encapsulating optically anisotropic particles in a volume of solid transparent material. The optical anisotropy is provided by having a portion of the surface of each particle light reflective or otherwise colored and the other portion of the particle surface of a different color or light absorbancy. Each particle occupies a cavity within the solid transparent material with the cavities being slightly larger than the size of the particles such that each particle has freedom to rotate or otherwise move slightly within its cavity. The volume of each cavity not occupied by an optically anisotropic particle is filled with a dielectric liquid. It is well known that when particles are dispersed in a dielectric liquid the particles acquire an electric charge related to the Zeta potential of their surface coating. Corresponding to the optical anisotropy of the particles of the proposed display, different surfaces of the particles present different Zeta potentials, with the result that the particles have an electrical anisotropy in addition to their optical anisotropy. Under the action of an addressing electric field, such as provided by a conventional matrix addressing scheme, selected of the optically and electrically anisotropic particles are made to rotate or otherwise shift their orientation within their cavities to provide a display by the selective absorbtion and reflection of ambient light. Since the particles need only rotate, not translate, to provide an image, much faster imaging response is achieved than with the display of U.S. Pat. No. 3,612,758. Also, the display can be addressed electrostatically which provides increased discrimination relative to displays using magnetic addressing or switching.

The display can be made by thoroughly mixing the optically anisotropic particles, preferably spherical in shape, with an uncured material, suitably an elastomer. Following heat curing of the elastomer-particle mixture, the cured elastomer-particle slab is placed in a plasticizer fluid, specifically a dielectric plasticizer, which fluid is absorbed by the elastomer thereby causing the elastomer material to swell and creating a spherical void or cavity around each of the optically anisotropic particles which do not substantially absorb the plasticizer fluid. These voids or cavities will be filled with the plasticizer fluid which will cause the encapsulated particles to acquire an electric charge such that upon the application of an electric field across selected portions of the elastomer, the particles within those portions of the elastomer will rotate within their cavities to provide an image.

BRIEF DESCRPITION OF THE DRAWINGS

DETAILED DESCRIPTION OF THE INVENTION

Figure 1:
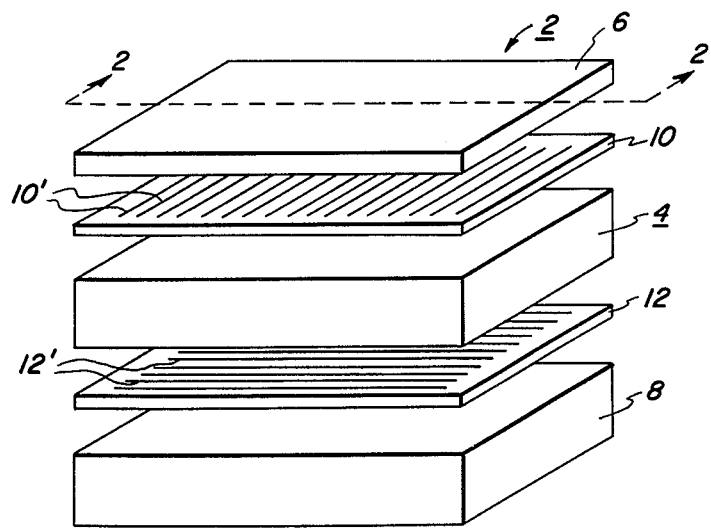
FIG. 1 is a perspective, exploded view of a display in accordance with the invention.

Referring to FIG. 1, reference character 2 designates, as a whole, a display which has a display panel 4 sandwiched between substrates 6 and 8. Intermediate the display panel 4 and substrate 6 is a first grid 10 of parallel electrical conductors 10', with a second grid 12, having parallel electrical conductors 12' oriented orthogonal to the conductors 10' of the first grid 10, provided between the substrate 8 and the display panel 4. At least one of the substrates 6 and 8 and at least the conductors of the grid adjacent that substrate are optically transparent so that ambient light can impinge upon the display panel 4 and so that the display provided by panel 4 can be viewed, as shown in FIG. 2, where substrate 6 and conductors 10' are of optically transparent materials to that the ambient light incident upon the display will provide a visible image at I.

The display panel 4 includes a distribution of minute particles 14 which are optically anisotropic. The particles 14 are surrounded by a transparent dielectric fluid which, due to the optical anisotropy of the particles 14 and the difference in Zeta potential due to the coatings used to achieve that optical anisotropy, causes the particles 14 to have an electrical anisotropy. In addition to the particles 14 and the dielectric liquid which surrounds those particles, the panel 4 includes a solid, optically transparent support material 15 which permits the particles 14 to have the desired rotational freedom without having translational freedom.

Figure 2:
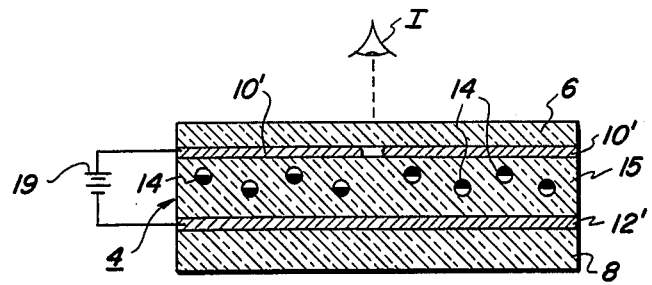
FIG. 2 is a sectional view of the display of FIG. 1 taken along line 2—2.
Figure 2A:
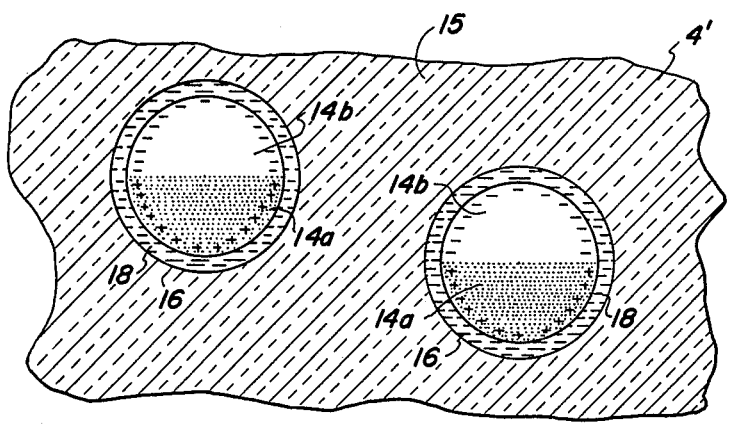
FIG. 2A illustrates an enlargement of a portion of the display of FIG. 1.

As shown in FIG. 2, the particles 14 of the panel 4 can be small spheres, typically 0.05 to 0.5 millimeters in diameter, which have hemispherical coatings of different Zeta potential. For example, as illustrated in FIG. 2a which shows a small, enlarged portion 4' of the panel 4, the difference in Zeta potential can be achieved by applying a coating to one hemisphere 14a of each of the spheres 14 that exhibits optical absorption characteristics, as illustrated by their dark shading, and applying a coating to the other hemisphere 14b of each of the spheres 14 that exhibits light reflectance characteristics, as illustrated by the absence of dark shading. The difference between the light reflectance-light absorption characteristics of hemispheres 14a and 14b provides the desired optical anisotropy. Specifically, the spheres 14 could be comprised of black polyethylene with a light reflective material, for example, titanium oxide, sputtered on hemisphere 14b to provide the spheres 14 with the desired light reflective and light absorptive hemispheres. As shown in FIG. 2A, each of the spheres 14 is located within a cavity 16 of the transparent support material 15. Cavities 16 have a diameter slightly larger than the diameter of spheres 14 so that spheres 14 have the previously alluded to rotational freedom without translational freedom. Filling the voids between spheres 14 and cavities 16 is an optically transparent dielectric liquid 18.

Due to the differences in Zeta potential between the hemispheres 14a and 14b and the immersion of each of the spheres 14 in the dielectric liquid 18, the spheres 14 acquire an electrical charge, as shown symbolically in FIG. 2A where hemispheres 14a are more positive than hemispheres 14b. When a power source 19 is coupled across one of the electrodes 10' of the grid 10 and one of the electrodes 12' of the grid 12, as shown in FIG. 2, the positively charged hemisphere 14a will be attracted to the more negative electrode 12' and the spheres 14 within the field developed by the energized electrodes 10' and 12' will rotate, but without substantial translation, such that the light reflecting hemispheres 14b are oriented toward I. Thus, a light spot on a dark background is provided. By reversing the polarity of source 19, a black spot on a light background can be provided. By sequentially coupling the source 19 to selected of the crossover points of electrodes 10' and 12', as is done in conventional matrix addressing, an image is provided and viewable at I.

Figure 3A:
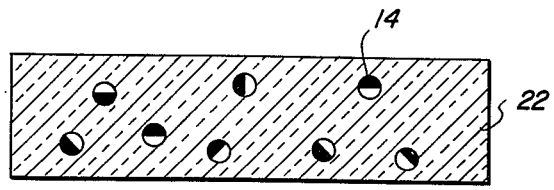
FIGS. 3A, 3B and 3C show a method of manufacturing the display of FIG. 1.
Figure 3B:
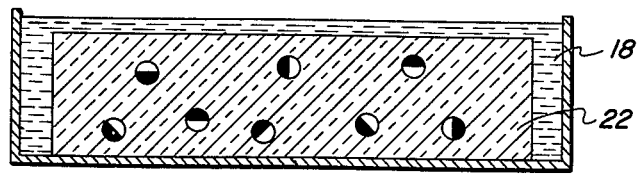

The panel 4 can be formed by thoroughly mixing the optically anisotropic particles 14 with an uncured (liquid), optically transparent material, for example, an uncured elastomer such as Dow Corning Sylgard 182. The optically transparent material is then cured, such as in the case of Sylgard 182 by rapid heating to an elevated temperature of about 140° Centigrade and maintaining the elastomer at that temperature for about 10 minutes, which provides the solid slab structure shown in FIG. 3A in which the spheres 14 are in contact with slab 22 and thereby refrained from either rotational or translational movement. Following curing of the slab 22, the slab is placed in a dielectric liquid plasticizer 18, as shown in FIG. 3B, for a short period of time, typically overnight, with the plasticizer at room temperature. For example, the dielectric liquid plasticizer 18 can be silicone oil, such as Dow Corning 10 Centistoke 200 oil when the elastomer is Sylgard 182. Another satisfactory elastomer/plasticizer combination is Stauffer and Waker V-53 elastomer with the above silicone oil.

Figure 3C:
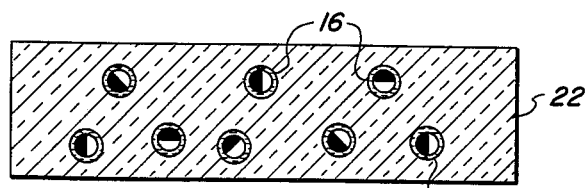

When the cured slab is placed in the plasticizer 18, the plasticizer is believed to be absorbed by the slab material resulting in a swelling of the slab material. The spheres 14 are made of a material which does not readily absorb the plasticizer or absorbs the plasticizer at a substantially slower rate than the material of slab 22 absorbs the plasticizer, with the result that the swelling of the slab 22 creates voids (spherical cavities 16) around the spheres 14, as shown in FIG. 3C. The voids or cavities 16 are filled with the plasticizer and this structure allows easy rotation of the spheres 14, while permitting essentially no translation of spheres 14.

The slab 22 need not be an elastomer and in lieu thereof can be a rigid plastic such as polyethylene, polystyrene or plexiglass. Encapsulation can be achieved with the encapsulant molten or dissolved in a volatile solvent. An uncured rigid material such as an epoxy can be used as the encapsulant provided that it is light transparent. It is necessary that the material of slab 22 absorb the plasticizer more readily than do the spheres 14 in order that the cavities 16 may be formed. When the material of slab 22 is an elastomer, the spheres can be plastics such as polyethylene or polystyrene which do not absorb the plasticizer as readily as elastomers. When the material of slab 22 is a plastic, the spheres must be of a material, which does not absorb the plasticizer, such as glass, or absorbs the plasticizer substantially less than the plastic.

The anisotropic spheres 14 should be coated with dielectric coatings. Black coatings may be obtained by the simultaneous evaporation of magnesium fluoride and aluminum in a vacuum chamber, whereas white coatings may be obtained by the slow deposition of indium.

When using a matrix of X and Y electrodes for accessing a display, it is desirable that the display exhibit a sharp threshold behavior so as to minimize the complexity of the electrical switching equipment. A threshold behavior can be achieved with the display of FIGS. 1 and 2 by slightly deforming the spherical cavities or voids 16 so that they take on an asymmetrical shape which slightly pinches the spheres 14. The applied electric field would have to overcome the frictional forces produced by the pinching before rotation of the spheres 14 is achieved, thus exhibiting a threshold behavior. Deformation of the spherical cavities 16 could be achieved by a piezo-electric device, provided in contact with one of the substrates 6 and 8 and pulsed slightly prior to the application of an electric field to a matrix crossover point defined by a pair of the electrodes 10' and 12' of the grids 10 and 12.

Figure 4:
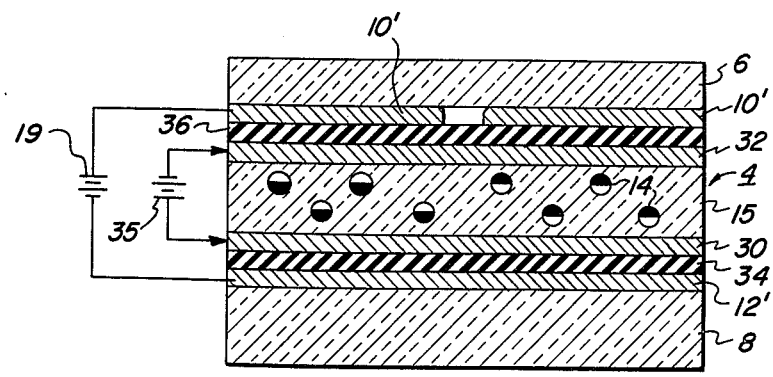
FIGS. 4, 5, 6 and 7 show other forms of a display in accordance with the invention.

Another useful threshold behavior configuration for use with matrix switching is shown in FIG. 4 wherein parts corresponding to like parts of FIGS. 1 and 2 have the same reference numerals. The device of FIG. 4 has additional electrodes 30 and 32 on opposite sides of the panel 4 which are electrically isolated from electrodes 10' and 12' by insulating layers 34 and 36. At least one of the electrodes 30 and 32 and its adjacent insulating layer are optically transparent. Electrodes 34 and 36 have a higher resistance per unit length than the resistance per unit length of electrodes 10' and 12' and are biased by source 35 to have a polarity opposite to that applied across electrodes 10' and 12' by the source 19. The electric field provided by source 35 and electrodes 30 and 32 will tend to orient spheres 14 in a common direction to start with, and will attract the spheres 14, causing the spheres 14 to press lightly up against and have frictional contact with the proximate portion of its associated cavity or void 16. To achieve orientation of the spheres 14 in a selected area of the display, the appropriate X and Y electrodes are activated by source 19 which, as noted, has a polarity opposite to that applied by source 35 across high resistance electrodes 32 and 34. The higher resistance electrodes may be thought of as electrically semi-transparent, since they are unable to convey enough charge to the vicinity of the X and Y matrix intersection to nulify the field created by electrodes 10' and 12' for times long compared to the rotation time of the spheres 14. Hence, as the desired X and Y matrix intersection is activated or accessed, the field across the spheres 14 proximate that intersection quickly decreases in magnitude. When the X-Y field produced by source 19 reaches the value of the field created by the high resistance electrodes and source 35 (the threshold field), the total field across the sphere encapsulation is now zero and the spheres are freed from their frictional contact with the cavity walls and are free to rotate. With further increase in the X, Y field provided by source 19 the spheres move toward the opposite cavity walls while rotating to a new orientation. When the spheres have rotated sufficiently, the X, Y matrix produced by source 19 is removed, allowing the field of the high resistance electrodes to drive the spheres back against the cavity walls with the spheres retaining their new orientation. Thus, the display of FIG. 4 has both threshold and memory capabilities.

The threshold and memory capabilities associated with the disclosed displays depend in some way upon utilization of frictional forces between the spheres 14 and their spherical encapsulating cavities 16. The frictional forces can be controlled still more by using spheres having a nonsmooth or roughened surface texture.

Figure 5:
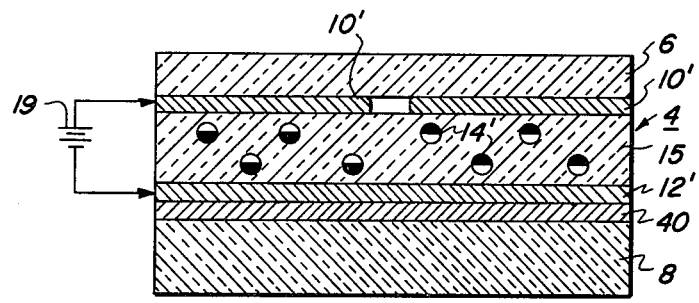

Threshold and memory capabilities are also provided by the display of FIG. 5 wherein the spheres 14' are of a ferromagnetic material and a sheet of ferromagnetic material 40 is provided between the substrate 8 and the electrodes 12'. Either the spheres 14' or the sheet 40 is permanently magnetized. In this structure, the spheres 14' are attracted electromagnetically to the sheet 40 and therefore pressed against the lower surface of their encapsulating cavities 16. The combination of the friction of the spheres 14' against their encapsulated cavities and the hysteresis of the induced magnetism present resistance to the rotation of the spheres 14' which must be overcome before spheres 14' will rotate under the influence of the electric field provided by electrodes 10' and 12' and source 19.

Threshold and memory capabilities can also be achieved by utilizing the frictional forces between the spheres and their encapsulating cavities. This could be achieved by using spheres having a non-uniform surface texture, that is, rough in one hemisphere and smooth in the other. Alternatively, instead of frictional forces, the spheres may be held in place against the walls of their encapsulating cavities by means of geometric constraints. For example, if slightly elipsoidal optically anisotropic particles are used and sufficiently large cavities are generated by the swelling of the elastomer, the particles will offer greater resistance to motion when held against the cavity walls, but can rotate easily when allowed to float in their cavity.

A threshold behavior can also be achieved by having the surface area of one Zeta potential material of the particles disproportionate with respect to the surface area of the other, different Zeta potential material of the particles. This will create, in cooperation with the dielectric fluid, a net electrostatic charge on the particles which will provide a memory affect by causing the particles to be pushed against a wall of their cavity in the presence of an electric field.

Figure 6:
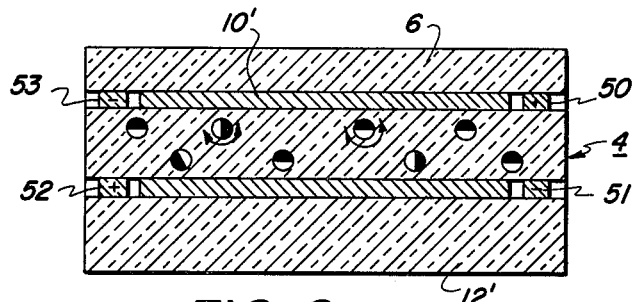

To avoid electrolysis problems that may arise in displays using DC field, a display using an AC field is shown in FIG. 6. In addition to the DC biased electrodes used to achieve orientation of the particles, AC biased electrodes are also used. Referring specifically to FIG. 6, AC electric fields are applied to strip electrodes 50, 51, 52 and 53, with the fields being of opposite polarity both side to side and top to bottom, as shown. Taking advantage of the finite rotational torque of the particles 14, the electrodes 50–53 are switched in polarity at a uniform rate, causing the particles to oscillate slightly about an equilibrium position as indicated by the doubleheaded arrows. At the correct switching rate the particle orientation is trapped in a kind of dynamic potential well. Upon perturbing the electric field by adding the field of DC switching electrodes 10' and 12' or changing the field values of the illustrated strip electrodes, the particles will rotate 180° to their opposite orientation. Upon reestablishment of the original AC electric field condition, the particles will now be stable about this new orientation. It is clear that the change in orientation can have a threshold characteristic.

A color display is also contemplated. Because of the binary nature of the display, the particles may be coated on one hemisphere with one color material and on the other hemisphere with another color material, provided these different materials have different Zeta potentials. The display panel could be broken up into several sections or stripes such that balls having different color coatings can be separately accessed for providing rotation thereof.

Figure 7:
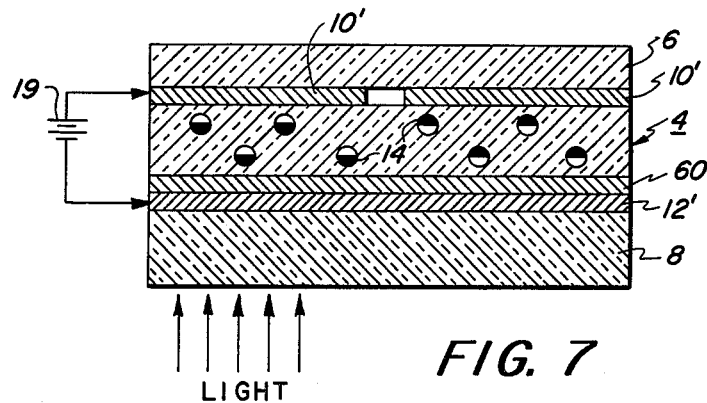

Addressing of the display can be achieved by other than matrix switching. In FIG. 7, a layer of photoconductive material 60 is provided between electrode 12' and panel 4. Light falling on portions of the photoconductive layer 60 through optically transparent substrate 8 and electrode 12' will change the field across those portions of the photoconductive materials sufficiently to allow the electric field provided by source 19 to rotate the spheres 14.

The particles or spheres used in the display can be encapsulated with freedom of rotational movement by ways other than swelling of an elastomer. For example, the optically anisotropic spheres could be mixed with glass or other optically transparent dielectric spheres of somewhat larger diameter. The larger spheres will tend to settle in close-packed array and the small anisotropic spheres will tend to occupy the interstitial positions between the larger spheres. The small, optically anisotropic spheres will be free to rotate but will be allowed only limited translational movement. An additional encapsulation technique would utilize a several micron thick layer of photoresist, suitably etched and subsequently baked to hardness to provide chambers for each anisotropic particle or group of such particles in a manner analogous to the chambering of eggs in an egg carton.

What I claim is:

1. An addressable display device comprising:
    a light transparent body having a plurality of optically anisotropic particles contained within dielectric liquid-filled cavities thereof, each of said particles having at least two dissimilar surfaces of contrasting optical characteristics and different Zeta potentials, the dissimilar surfaces of said particles and the distribution of said particles in said dielectric liquid causing said particles to have an electrical anisotropy, and
    addressing means for applying an electric field across selected portions of said body whereby the particles contained within said selected portions of said body will rotate in accordance with their electrical anisotropy to provide a display in accordance with their optical anisotropy.

2. The display of claim 1 wherein each of said optically anisotropic particles has a surface portion which has a light absorbancy greater than the light absorbancy of another surface portion.

3. The display of claim 1 wherein each of said optically anisotropic particles has one surface portion of one color and another surface portion of a different color.

4. The display of claim 1 wherein said particles are spherical and said particles have at least one hemispherical coating that provides their optical anisotropy.

5. The display of claim 1 wherein said body is elastomeric.

6. The display of claim 1 wherein said cavities have an asymmetrical shape whereby said display has a threshold behavior.

7. The display of claim 6 wherein the asymmetrical shape of said cavities is produced by a piezoelectric device coupled to said body.

8. The display of claim 1 wherein said particles are of elliptical shape.

9. The display of claim 4 wherein said particles are rough in one hemisphere and smooth in the other hemisphere.

10. The display of claim 1 wherein threshold and memory capabilities are provided by additional means for preventing rotation of said particles within selected portions of said body until the field across said selected portions of said body exceeds a threshold value.

11. The display of claim 10 wherein said addressing means is comprised of a matrix of electrodes on opposite sides of said body and means for accessing the matrix crossover points.

12. The display of claim 11 wherein said additional means is an additional electrode on said opposite sides of said body and electrically isolated from said matrix electrodes, said additional electrodes having a higher resistance per unit length than said matrix electrodes, said additional electrodes being biased oppositely to the bias applied to said matrix electrodes.

13. The display of claim 10 wherein said particles are of a ferromagnetic material and said additional means is a sheet of a ferromagnetic material positioned adjacent one side of said body.

14. The display of claim 1 wherein said addressing means includes a photoconductive layer.

15. The display of claim 1 wherein said addressing means includes means for applying AC and DC fields across said body.

16. An addressable display device comprising:
    a plurality of optically anisotropic particles contained within cavities of a light transparent body, said cavities being slightly larger than said particles such that said particles can have rotational movement but substantially no translational movement, said cavities also containing a liquid dielectric, each of said particles having at least two dissimilar surfaces of contrasting optical characteristics and different Zeta potentials, the dissimilar surfaces of said particles and the liquid dielectric being responsible for imparting an electrical anisotropy to said particles, and
    addressing means for electrically addressing selected portions of said body to provide rotation of the particles within said cavities within said portions of said body to provide a display.

17. An addressable display device comprising:
    a light transparent body having a plurality of cavities therein, at least some of said cavities each containing a single optically anisotropic particle and a dielectric liquid, each optically anisotropic particle having at least two dissimilar surfaces of contrasting optical characteristics and different Zeta potentials so that each particle further exhibits an electrical anisotropy when distributed in said dielectric liquid, and
    addressing means for applying an electric field across selected portions of said body whereby the particles contained within said selected portions of said body will rotate in accordance with their electrical anisotropy to provide a display in accordance with their optical anisotropy.

* * * * *